(12) United States Patent
Yolleck et al.

(10) Patent No.: US 7,475,352 B2
(45) Date of Patent: Jan. 6, 2009

(54) LAYOUT AND MANAGEMENT OF BROWSER PANES

(75) Inventors: Stephen M. Yolleck, Sunnyvale, CA (US); David S. Korn, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/260,211

(22) Filed: Oct. 28, 2005

(65) Prior Publication Data

US 2007/0101298 A1 May 3, 2007

(51) Int. Cl.
*G06F 13/00* (2006.01)
*G06F 15/00* (2006.01)

(52) U.S. Cl. .................................... 715/740; 715/853

(58) Field of Classification Search ......... 715/763–765, 715/740–745, 853–855; 709/209, 223
See application file for complete search history.

(56) References Cited

U.S. PATENT DOCUMENTS

2002/0186249 A1* 12/2002 Lu et al. .................. 345/781
2006/0122904 A1* 6/2006 Shafron et al. ............ 705/26

* cited by examiner

*Primary Examiner*—Kevin Nguyen
(74) *Attorney, Agent, or Firm*—Shook, Hardy & Bacon L.L.P.

(57) ABSTRACT

The invention presents a system and method for reserving space within a browser for a requesting component. The invention can reserve space above, below, to the right, or to the left of a main browsing section for a requesting component. The invention can adjust the main browsing section in order to fit a plurality of spaces created for requesting components. The spaces reserved can be presented in a manner that does not obstruct any viewable areas of the main browsing section.

19 Claims, 4 Drawing Sheets

LAYOUT AND MANAGEMENT OF BROWSER PANES

CROSS-REFERENCE TO RELATED APPLICATION

Not applicable.

STATEMENT REGARDING FEDERALLY SPONSORED RESEARCH OR DEVELOPMENT

Not applicable.

BACKGROUND

There may be times when it is necessary to for a browser component to interact with a user. This may involve both showing information and receiving user input. A form filling application, for example, may need to show the user's address book and can allow the user to choose an address. Conventionally, browser components can display a custom dialog box that can allow user input, and browser components can show the user an alert by using a message box that displays information and allows no user input. The two example techniques above, however, are unsatisfactory because they both can require showing a popup window that obscures the content of the page the user is currently browsing. These popup dialogs can also be unsatisfactory because the user may have to close the dialog before the user can continue using the browser.

SUMMARY

The invention is directed towards a system and method for reserving space within a browser for a requesting component. The method can include subclassing a browser and receiving at least one request for space within the browser. Additionally, the method can include creating one or more windows within the browser corresponding to the requested space. The invention can be configured to return a handle for each of the one or more created windows.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
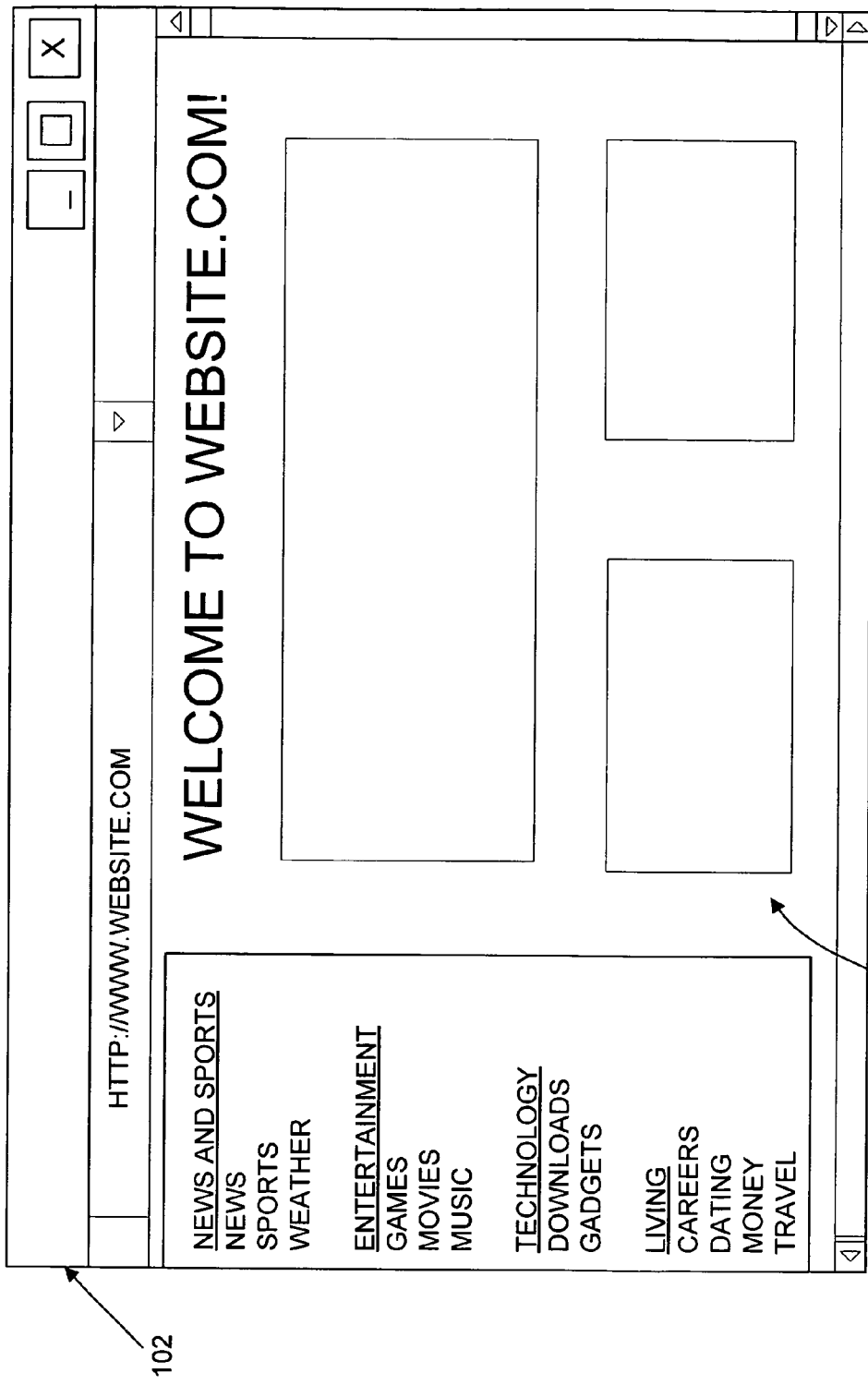
FIG. 1A illustrates an embodiment of a browser before a controlling application creates a browser pane for any requesting components.

The invention presents a solution for displaying information for browser components by creating a controlling application that can allow browser components to request space inside the browser itself. The component can ask the controlling application to reserve space above, below, to the left and/or to the right of an embedded browser window. Additionally, the component can request space in a region that is both above and to the left, above and to the right, below and to the left, and/or below and to the right of the embedded browser window. The controlling application can reserve the space by adjusting the embedded browser window to accommodate the space requested by the component. The controlling application can also notify the components when the user has adjusted the browser so that the component can layout its user interface.

The invention discloses a method and system for allocating space within a browser for a component. A controlling application can be used to allocate the space for a component within the browser. Such a controlling application can be, for example, a Microsoft Network Explorer Panes (MSNEP) application. MSNEP can be a dynamic link library (DLL) that can use the Component Object Model (COM) to communicate with other components and DLLs. Some types of components that can request space within a browser can include, for example, a popup blocker component that can request space to inform a user that a popup has been blocked, a tabbed browsing component that can request space to insert a tab band, and a form fill component that can request space to present the user with options from the user's address book, credit card information, or any other user profile information. It should be understood, however, that the invention should not be limited to the above examples, and a component can be any other type of component that can request space within a browser.

The space requested by a component can include browser panes for displaying information. The browser panes themselves can be comprised of one or more windows. The browser panes can be positioned in a region above, below, to the left, and/or to the right of a main browsing section. Additionally, the browser panes can be located in a region that is both above and to the left, above and to the right, below and to the left, and/or below and to the right of the main browsing section. The main browsing section can include a web browsing section, an email section, a word processing section, a document creation section, or any other viewable section for displaying any type of multimedia information. The invention can be configured to allow each component to have its own browser pane occupying its own reserved space. There can be as many browser panes within a client area of the browser as requested by a plurality of components. The browser panes can be displayed simultaneously with each other in a manner that does not obscure any viewable areas of the main browsing section.

The invention can be utilized within any type of client. A client may be or include a desktop or laptop computer, a network-enabled cellular telephone, wireless email client, or other client, machine or device to perform various tasks including Web browsing, search, electronic mail (email) and other tasks, applications and functions. The client may also be or can include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. The client may additionally be any portable media device such as digital still camera devices, digital video cameras, media players such as personal music players and personal video players, and any other portable media devices.

The client can include a communication interface. The communication interface may be an interface that can allow the client to be directly connected to any other client or device or allows the client to be connected to a client or device over a network. The network can include, for example, a local area network (LAN), a wide area network (WAN), or the Internet. In an embodiment, the client can be connected to another client or device via a wireless interface.

Figure 1B:
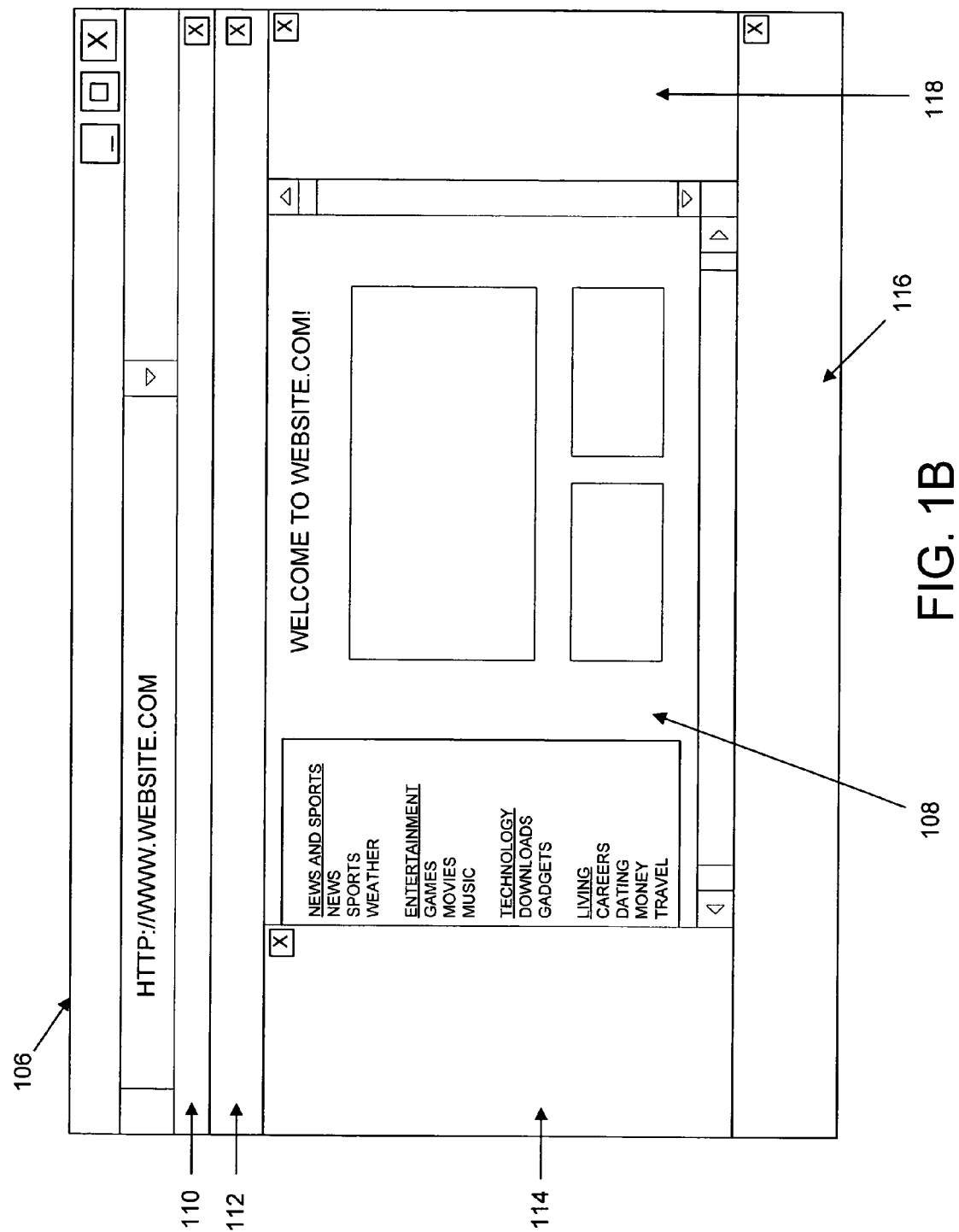
FIG. 1B illustrates an embodiment of a browser including a plurality of browser panes created by a controlling application for a plurality of components.

FIG. 1A illustrates an embodiment of a browser before a controlling application creates a browser pane for any requesting components. The browser 102 can have a main browsing section 104 that can encompass the entire client area of the browser. The main browsing section can include a web browsing section, an email section, a word processing section, a document creation section, or any other viewable section for displaying any type of multimedia information. FIG. 1B illustrates an embodiment of a browser 106 including a plurality of browser panes 110, 112, 114, 116, and 118 created by a controlling application for a plurality of components. The main browsing section 108 can be the same as the main browsing section 104, but the main browsing section 108 has been adjusted due to the addition of the browser panes created by the controlling application. Adjusting can include moving and resizing the main browsing section 108. As shown in FIG. 1B, the browser panes can be positioned in any region above, below, to the left and/or to the right of the main browsing section 108 in a manner that does not obstruct any viewable areas of the main browsing section 108. Additionally, the browser panes can be located in a region that is both above and to the left, above and to the right, below and to the left, and/or below and to the right of the main browsing section in a manner that does not obstruct any viewable areas of the main browsing section 108. As illustrated with browser panes 110 and 112, a plurality of browser panes can be positioned in the same region.

Figure 2:
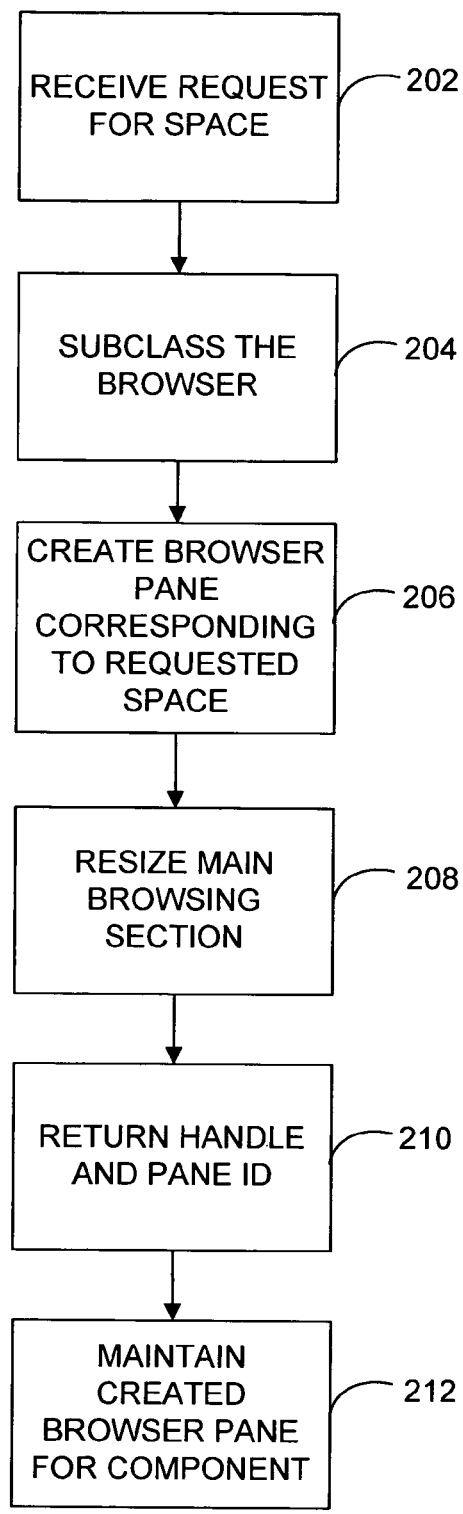
FIG. 2 illustrates an embodiment of a block diagram showing a method for creating space within a browser for a requesting component.

FIG. 2 illustrates an embodiment of a block diagram showing a method for creating space within a browser for a requesting component. The requested space can be created in the form of a browser pane. The browser pane can comprise one or more windows. Components can instantiate the controlling application via COM, and can receive a pointer to a communication interface from the controlling application. The communication interface can be a mechanism that includes a set of functions that can enable the component and the controlling application to communicate with each other. The communication interface can be, for example, an IIEPane interface.

Once the component receives the pointer, the component can request space within the browser from the controlling application, and the controlling application can receive the request at step 202. The request can include a number of input variables from the component that are needed by the controlling application in order for the controlling application to reserve space for the component. The input variables can be received in a request through use of one or more application program interfaces (APIs). One input variable can be a pointer to an instance of the browser that the component can previously receive from the browser. The controlling application can use the pointer to the browser in order to subclass the browser at step 204. Subclassing the browser can include the controlling application latching onto the browser in order to intercept messages that are sent to and from the browser. Once messages have been intercepted by the controlling application, the controlling application can modify those messages in order for the it to dictate what it wants the browser to know or do.

Another input variable that can be included in the request can be information that can describe the region in which the component would like to have its browser pane located. The component can request to have its browser pane to be above, below, to the right, or to the left of the main browsing section. Additionally, the component can request to have its browser pane to be in a region that is both above and to the left, above and to the right, below and to the left, and/or below and to the right of the main browsing section. Yet another input variable included in the request can be information that describes the size of the browser pane that the component wants. This information can include a number of pixels that corresponds to the size of the browser pane that the component would like to have. In an embodiment, the component may only need to provide one coordinate of pixels. For example, if the component requests to have its browser pane in a horizontal position above or below the main browsing section, the controlling application may only need to know one coordinate of pixels that relate to how high the component wants the pane to be because the width of the browser pane can be determined on how wide the main browsing section already is. In another embodiment, the component can specify the length and width of the requested browser pane can be specified.

Another input variable can be information that can describe the position of the requested browser pane relative to other browser panes that are currently in the same region that the component wishes to have its browser pane, and the information can describe the position of the requested browser pane relative to other browser panes that may be subsequently created in the same region. For example, if a component wishes to have its browser pane created in a region above the main browsing section, the component can request for its browser pane to be at the top of any browser pane created in that region. In an embodiment, if two or more components request to be in the same location of a region, the controlling application can honor the request of the component who made the request first.

Yet another input variable included in the request can be a callback interface that can allow the component to receive events from the controlling application. An event can be any type of information that the component may be interested in knowing from the controlling application. For example, the component may want to know if the main browsing section has been adjusted, or the component may want to know if the user has clicked in the main browsing section using a mouse cursor. But again, the events can correspond to any type of information that a component may want to know from the controlling application and should not be limited to the above examples.

Once the controlling application receives the request and evaluates the input variables, the controlling application can create a browser pane that corresponds to the request at step 206. The controlling application can then adjust the main browsing section accordingly to the number of pixels being used by the newly created browser pane at step 208. For browser panes that are created subsequently, the controlling application can compute the number of pixels being used by all browser panes and can adjust the main browsing section according to the total number of pixels being used. Once the browser pane is created, the controlling application can return a window handle and a pane identifier (pane ID) back to the component at step 210. In an embodiment, the window handle and the pane ID can be returned using the same one or more APIs that were used to transmit the input variables to the controlling application, or at least one different API can be used to return the window handle and pane ID. The pane ID can be an arbitrary number assigned by the controlling component to the created browser pane. The window handle can allow the component to customize and manipulate the created browser pane.

Once the browser pane has been created for the component, at step 212, the controlling application can maintain the space that was created for the component and for any other component that subsequently requests space for a browser pane. The controlling application can make sure that all components that have browser panes located within the browser are connected to the main browsing section by informing the components of any changes made to the main browsing section. Since the controlling application can subclass the browser, the controlling application can listen for any messages being sent to the main browsing section directing the main browsing section to change its size, and the controlling application can listen for any messages sent from the main browsing section as a request to change its size. The controlling application can then modify these messages in order for the controlling application to dictate what it wants the browser to know or do. For example, the controlling application can manage a plurality of browser panes that it created within a browser for a plurality of components. When the controlling application intercepts a message being sent to the main browsing section requesting that the main browsing window change its size, the controlling application can modify that message to control the size of the main browsing section based on an evaluation of the pixels being used by all browser panes. Therefore, the controlling application can always maintain the space that it has reserved for any created browser panes regardless if the main browsing section attempts to change its size.

Figure 3:
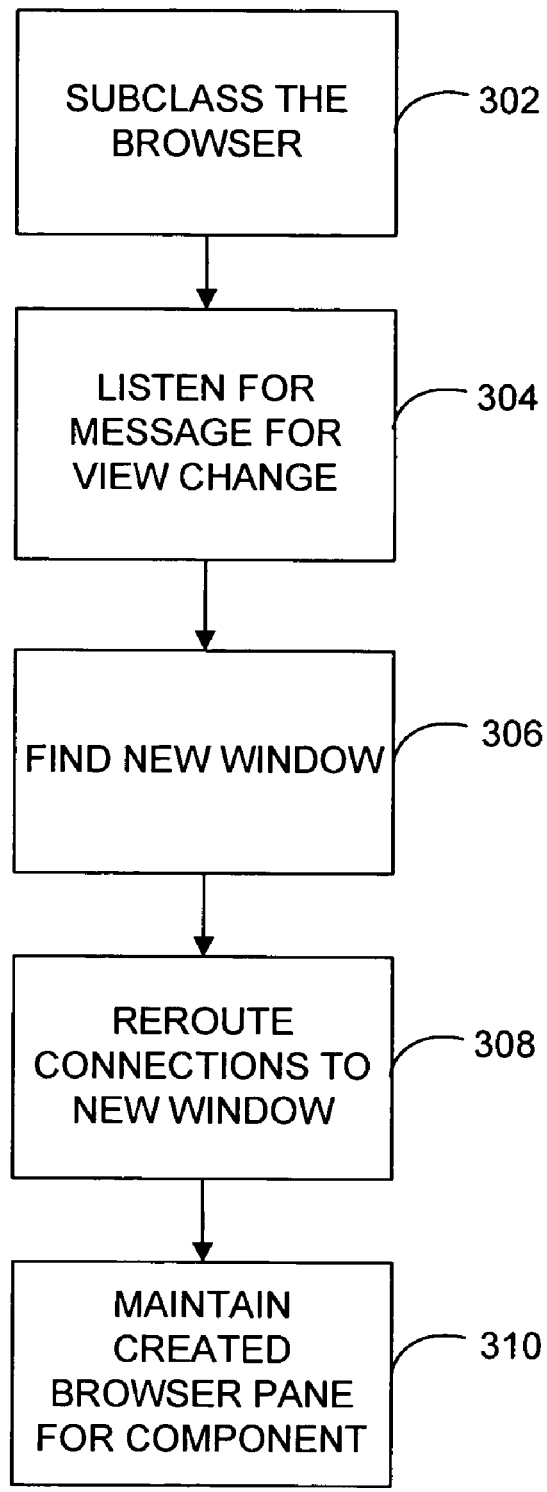
FIG. 3 illustrates an embodiment of a block diagram showing a method for maintaining space for created browser panes when switching between two types of browser views.

FIG. 3 illustrates an embodiment of a block diagram showing a method for maintaining space for a created browser pane when switching between two types of browser views. In an embodiment, one type of view can be a web view and another type of view can be a file system view. A web view can be, for example, a "Shell DocObject View" that can be presented when a user inputs a URL (http://URL) into an address field of a browser. A file system view cab be, for example, a "ShellDLL_DefView" that can be presented when a user inputs "C:\" into an address field of a browser.

When switching between the two types of views, the browser can destroy the current window of the main browsing section before switching to the new view and supplementing a new window of the main browsing section. This can be problematic as the browser does not directly inform a controlling application of the change in view which may make it difficult for a controlling application to maintain the space it created for requesting components. Since the controlling application is not informed of the change, and because the components are connected to the main browsing section through the controlling application, the components may also not be informed of the change and therefore would not know that they may need to modify their user interfaces to their respective browser panes due to the change in windows. The invention, however, can be utilized so that the controlling application maintains the size of browser panes and the size of the window corresponding to the main browsing section when switching from one type of view to another.

In step 302, the controlling application can subclass the browser in order to listen and intercept messages regarding a view change within the browser. Again, the controlling component can initially subclass the browser by receiving a pointer to an instance of the browser from a component. Once the controlling application intercepts a message that the window corresponding to the current main browsing section is being destroyed and is being replaced with a new window that corresponds to a main browsing section of a new view type, the controlling application can begin to search for the new window at step 306. For example, in an embodiment, the controlling application can search for the new window by looking for a window that has the same center coordinate as the window of the main browsing section that was destroyed.

Once the new window that corresponds to the main browsing section of the new view type has been located, the controlling application can reroute the connections from the components that currently have browser panes within the browser to the new window at step 308. Once the connections have been rerouted, in step 310, the controlling application can maintain the space allocated for the browser panes for each component and for any browser pane subsequently created in the same manner as outlined in step 212 above (FIG. 2).

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A computer-implemented method for reserving space within a browser, comprising:
    subclassing the browser, wherein subclassing comprises the steps of allowing a controlling application to intercept messages that are sent to and from the browser, and permitting the controlling application to modify the intercepted messages in order to control the browser;
    receiving at least one request from a component for space within the browser, wherein the space requested is utilized for at least one browser pane for displaying information, and wherein the at least one request includes at least one input variable selected from a list comprising: information that describes a region of the browser in which the component requests to have its browser pane located, information that describes a position of the at least one browser pane relative to other browser panes, and a callback interface that permits the component to receive events from the controlling application;
    creating one or more browser panes within the browser corresponding to the request for space; and
    returning a handle for each of the one or more created browser panes, wherein the handle permits the component to customize and manipulate the one or more created browser panes.

2. The method according to claim 1, wherein receiving the at least one request for space comprises intercepting a message.

3. The method according to claim 1, further comprising adjusting a first browser section based on the one or more created browser panes.

4. The method according to claim 3, further comprising maintaining a size of the one or more created browser panes when switching between a first view type and a second view type.

5. The method according to claim 4, wherein the first browser section corresponds to at least one of a web view and a file system view, and the first and second browser views are different.

6. The method according to claim 3, further comprising rerouting at least one connection from at least one component to a second browser section when the first browser section is destroyed.

7. The method according to claim 6, further comprising searching for the second browser section by evaluating a coordinate of the first browser section.

8. The method according to claim 6, further comprising adjusting the second browser section based on the created browser panes.

9. The method according to claim 3, wherein the one or more created browser panes are located in at least one of an above region, a below region, a right region, and a left region relative to the first browser section.

10. A computer-readable storage medium embodying instructions for performing a method for maintaining reserved space within a browser during a change between view types, comprising:

subclassing the browser having a first window of a first view type, wherein the first view type is selected from a list comprising: a file system browsing view and a web browsing view;

wherein subclassing the browser comprises the steps of allowing a controlling application to intercept messages that are sent to and from the browser, and permitting the controlling application to modify the intercepted messages in order to control the browser;

receiving at least one request from a component for space within the browser, wherein the space requested is utilized for at least one browser pane for displaying information, and wherein the at least one request includes at least one input variable selected from a list comprising: information that describes a region of the browser in which the component requests to have its browser pane located, information that describes a position of the at least one browser pane relative to other browser panes, and a callback interface that permits the component to receive events from the controlling application;

receiving a message that the first window is being destroyed;

searching for a second window having a second view type, wherein the second view type is different than the first view type; and rerouting at least one connection from one or more components that previously had viewing panes within the first window to viewing panes in the second window.

11. The method according to claim 10, wherein searching for the second window comprises evaluating a coordinate of the first window.

12. The method according to claim 10, further comprising, adjusting the second window based on a size of a browser pane of the one or more components.

13. The method according to claim 10, further comprising creating one or more windows within the browser that are located in at least one of an above region, a below region, a right region, and a left region relative to the second window.

14. The method according to claim 10, wherein receiving the messages comprises intercepting the message.

15. A computer-readable storage medium storing an application program interface for reserving space within a browser, comprising:

a subclassing module for subclassing the browser, said subclassing module comprising intercepted messages sent to and from the browser and modified messages to control the browser;

a receiving module for receiving at least one request for space within the browser, wherein the space requested is utilized for at least one browser pane for displaying information, and wherein the at least one request for space includes at least one input variable selected from a list comprising: information that describes a region of the browser in which the component requests to have its browser pane located, information that describes a position of the at least one browser pane relative to other browser panes, and a callback interface that permits the component to receive events from the controlling application;

a registration module for registering at least one component; and a browser pane creation module for creating one or more browser panes within the browser corresponding to the request for space.

16. The application program interface according to claim 15, wherein receiving the at least one request for space comprises intercepting a message.

17. The application program interface according to claim 15, wherein the browser pane creation module maintains a size of the one or more created browser panes when switching between a first view type and a second view type.

18. The application program interface according to claim 17, wherein the first view type is at least one of a web view and a file system view, and the first and second view types are different.

19. The application program interface according to claim 15, wherein the one or more created browser panes are located in at least one of an above region, a below region, a right region, and a left region relative to a first browser section.

* * * * *